(12) United States Patent
Riddick

(10) Patent No.: US 10,454,912 B2
(45) Date of Patent: Oct. 22, 2019

(54) METHOD AND SYSTEM FOR USER AUTHENTICATION

(71) Applicant: Total System Services, Inc., Columbus, GA (US)

(72) Inventor: Donald Morford Riddick, Cataula, CA (US)

(73) Assignee: Total System Services, Inc., Columbus, GA (US)

( * ) Notice: Subject to any disclaimer, the term of this patent is extended or adjusted under 35 U.S.C. 154(b) by 40 days.

(21) Appl. No.: 15/267,882

(22) Filed: Sep. 16, 2016

(65) Prior Publication Data

US 2017/0078262 A1 Mar. 16, 2017

Related U.S. Application Data

(60) Provisional application No. 62/219,377, filed on Sep. 16, 2015.

(51) Int. Cl.
*H04L 29/06* (2006.01)
*G06F 21/31* (2013.01)
*G06F 3/0482* (2013.01)

(52) U.S. Cl.
CPC .............. *H04L 63/08* (2013.01); *G06F 21/31* (2013.01); *G06F 3/0482* (2013.01)

(58) Field of Classification Search
CPC ....... H04L 63/08; H04L 29/06; G06F 3/0482; G06F 21/31
USPC ............................................................ 726/7
See application file for complete search history.

(56) References Cited

U.S. PATENT DOCUMENTS

2015/0188898 A1* 7/2015 Chow .................... H04L 63/08
726/7
2016/0182424 A1* 6/2016 Maginnis .............. H04W 4/029
709/206

* cited by examiner

*Primary Examiner* — Evans Desrosiers
(74) *Attorney, Agent, or Firm* — Ballard Spahr LLP

(57) ABSTRACT

Disclosed are methods and systems for user authentication. User-specific data is aggregated by an authentication system. Answers to authentication questions are identified in the aggregated data. A user device attempting to authenticate with the authentication system is presented with the authentication question and selectable options for answering the authentication question. The selectable options include one or more valid answers and one or more false answers. A user device is authenticated after correctly answering one or more presented authentication questions.

20 Claims, 5 Drawing Sheets

METHOD AND SYSTEM FOR USER AUTHENTICATION

CROSS REFERENCE TO RELATED PATENT APPLICATION

This application claims priority to U.S. Provisional Application No. 62/219,377 filed Sep. 16, 2015, herein incorporated by reference in its entirety.

BACKGROUND

Authentication systems typically employ a password-based system to authenticate a user. As a user is registered with various systems and services, the number of passwords required for a user to remember increases. The user may also be inconvenienced as different services require differing policies for password construction, reuse, and changing. Additionally, for a given service, the same password is used repeatedly for subsequent authentication sessions if the password is compromised it can be reused for additional sessions by a malicious user.

SUMMARY

It is to be understood that both the following general description and the following detailed description are exemplary and explanatory only and are not restrictive. Provided are methods and systems for user authentication. An authentication system accesses multiple data points related to a user. These data points may include a transaction history, purchase history, social networking activity, or other data points. The authentication system presents a user with a series of questions based on these data points. Each question may be answered through a selection of one or more answers from a series of potential answers. To authenticate, the user must select the correct answers for each question. As the questions and the potential answers are dynamically generated, they can vary across authentication attempts. Thus, the specific set of answers provided by a user for a given authentication attempt are not applicable to subsequent authentication attempts. This provides increased security as a compromised set of answers for the given authentication attempt cannot be used by a malicious party to subsequently authenticate with the authentication system.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
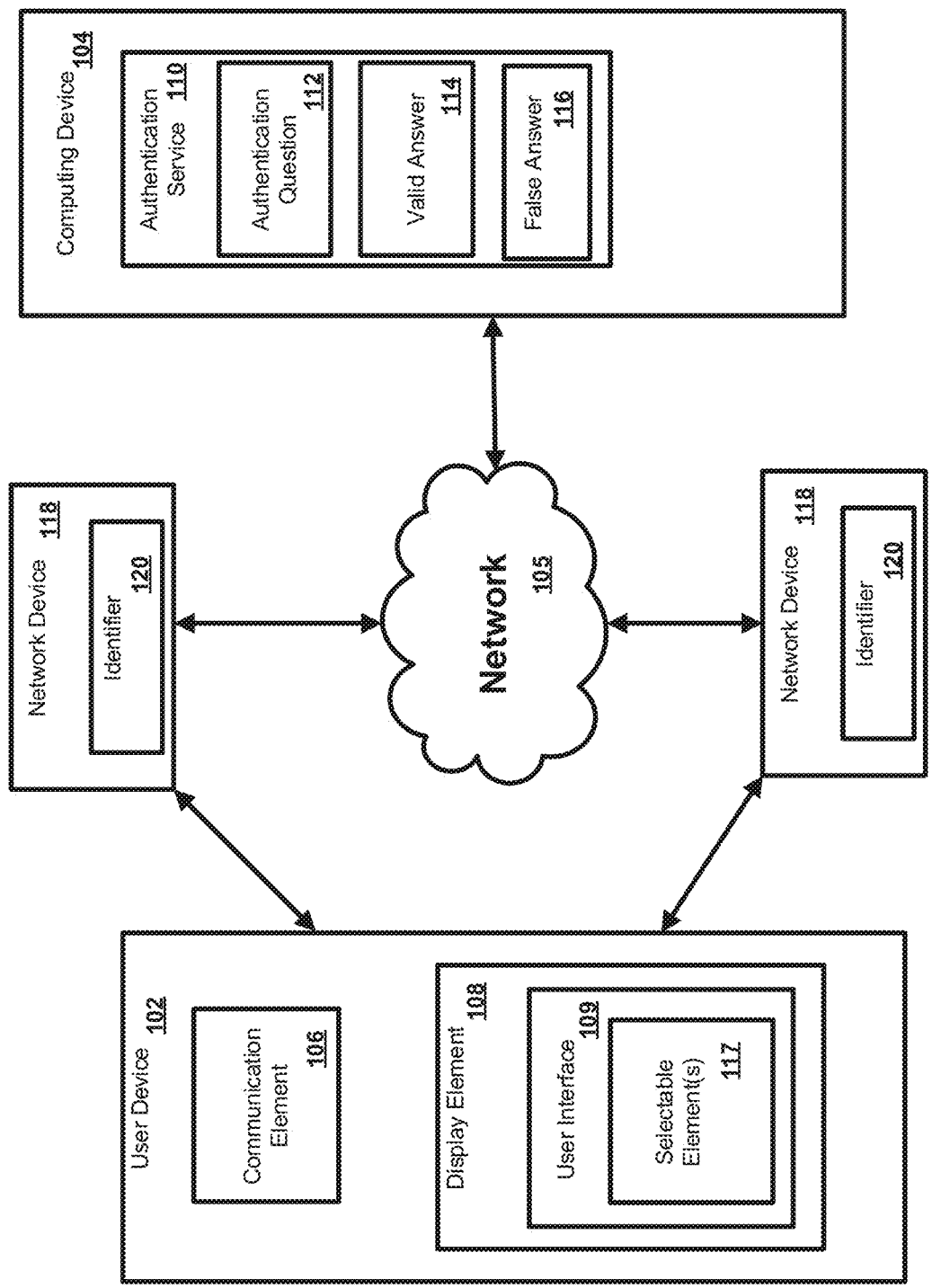
FIG. 1 is a block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for perforating the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a method for authenticating a user device with an authentication system. In an aspect, the authentication system accesses various transaction histories or other data points associated with a user account. For example, the authentication system may access a financial transaction history. The financial transaction history may indicate, for example, an amount of funds associated with a transaction, a vendor or merchant in a transaction, an indication of one or more goods or services associated with a transaction, or other data. The authentication system may also access purchase histories or order histories of third-party merchants. For example, a user may grant permissions or authentication credentials to the authentication system to access the third-party merchants. In an aspect, the authentication system may access social networking information or other user profiles to aggregate data points with respect.

Using the aggregated user data, the authentication service selects one or more answers to authentication questions to be presented to a user. For example, the authentication question may ask for a user to identify merchants or vendors from which the user has purchased within a predefined time period. The authentication question may also ask for a user to identify goods or services purchased within the predefined time period, having a price above or below a price threshold, or satisfying other criteria. Additionally, the authentication question may ask for an indication of relationships, interests, or other activities associated with a social networking account. The answers selected by the authentication service would serve as valid answers to the respective authentication question.

To authenticate a user device, a user is presented with one or more authentication questions and a pool of selectable options including both the valid answers identified by the authentication service, as well as false answers. In an aspect, the authentication service may be configured to randomly select the authentication questions from a pool of possible authentication questions. In a further aspect, the authentication service may be configured to randomly generate the pool of selectable options for each instance of presenting a given authentication question to a user. To authenticate the user device, the user must select the one or more valid answers from the pool of options. In an aspect, the user must select every valid answer present in the pool of options, and not select any of the false answers. In another aspect, the user may select a percentage or portion of the valid answers above a threshold, but not select any of the false answers. In a further aspect, the user may be presented with a series of authentication questions, and must correctly answer each of the authentication questions to be fully authenticated.

In one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as on/eh browser (e.g., Internet Explorer, Mozilla Firefox, Google Chronic, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can include a display element 108. The display element 108 can include, for example, a monitor, capacitive or touch screen display, e-ink display, or other display as can be appreciated. The display element 108 can render a user interface 110 as will be discussed in further detail below.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the authentication between the user device 102 and an authentication service 110. In an aspect, the authentication service 110 may maintain a series of authentication questions 112 soliciting a user selection of one or more valid answers 114. The authentication questions 112 may be associated with one or more parameters or criteria that a given data point would satisfy, thereby being considered a valid answer 114. In an aspect, for a given user account, the authentication service 110 aggregates data from transaction histories, social networking profiles, or other data sources associated with the user account. The transaction histories may include, for example, financial transactions or purchases, and indicate goods or services purchased, vendors or merchants, prices, or other information. Data from the social networking profile may include interests, personal connections, group memberships, or other data as can be appreciated.

In an aspect, the authentication service 110 may aggregate data from services associated with the authentication service 110. For example, the authentication service 110 may be implemented to authenticate a user device 102 with a financial transaction service. The authentication service 110 may then have permissions to access the transaction history of the user with the given financial transaction service. In another example, a user may provide permissions, authentication credentials, or other data facilitating access to a third-party account or service by the authentication service 110. For example, a user may grant permissions for the authentication service 110 to access asocial networking account of a user. As another example, a user may provide authentication credentials for a third-party service to the authentication service 110. The authentications service 110 may then access application program interfaces (APIs) provided by the third party service, or parse content provided by the third-party service using the authentication credentials in order to aggregate the data for a given user.

In an aspect, the data aggregated by the authentication service 110 may be controlled according to user permissions. In an aspect, the user permissions may restrict a time frame, purchase amount, payment instrument, or other attribute of data that may be used by the authentication service 110. For example, user permissions may restrict the authentication service 110 to aggregating or using transaction data above a purchase amount threshold. As another example, user permissions may restrict the authentication service 110 to accessing transactions for a particular merchant or third-party service.

Using this aggregated data, the authentication service 110 identifies one or more valid answers 114 for a given authentication question 112. In an aspect, the authentication question 112 comprises a "yes/no," "true/false," or multiple choice question answerable based on aggregated data of a user. The authentication question 112 may have one or mime corresponding valid answers 114. For example, an authentication question 112 may solicit an indication of merchants from which the user has purchased in a predefined time period, e.g. the last week or the last month. The authentication service 110 may then identify merchants indicated in a given user's transaction history corresponding to the time period indicated in the authentication question 112. The identified merchants would then be defined as valid answers 114 to the authentication question 112 for a given user.

In another aspect, the authentication service 110 may have insufficient data to determine valid answers 114 for a given authentication question 112. For example, a new user may not have an associated transaction history. As another example, the authentication service 110 may not identify answers for a threshold number of authentication questions 112. In such an aspect, the authentication service 110 may receive indications of valid answers 114 for a given authentication question 112 from an authenticated user device 102. In such an aspect, the authentication questions 112 to which the user device 102 provides valid answers 114 may or may not be associated with transactional or social data as described above. For example, the authentication service 110 may request one or more pet names, travel destinations, or other information from a user. The provided valid answers 114 may then be used for authentication questions 112 in subsequent authentication attempts.

In an aspect, to authenticate a user device 102, the authentication service 110 may require a user of a user device 102 to answer one or more authentication questions 112. In an aspect, the authentication service 110 may select a predefined number of authentication questions 112 from a pool of authentication questions 112. The authentication service 110 may select the authentication questions 112 randomly, based on a frequency or last date of use of an authentication question 112, or according to other criteria. Thus, each attempt to authenticate a user device 102 may result in a different set of selected authentication questions 112.

For each selected authentication question 112, the authentication service 110 transmits an authentication question 112 and a pool of selectable answers to the user device 102. The pool of selectable answers can include one or more valid answers 114 and one or more false answers 116. In an aspect, the one or more valid answers 114 or false answers 116 may include an "all of the above" or "none of the above" answer. In an aspect, the authentication service 110 may select the valid answers 114 from a subset of valid answers 114 for a given authentication question 112. In an aspect, the authentication service 110 may select the false answers 116 from a subset of possible false answers 116. In an aspect, the false answers 116 may be derived from a pool of false answers 116 independent of a user account or user device 102. In another aspect, the false answers 116 may be derived from the aggregated data of for a given user account, and identified as a false answer 116 for not satisfying all of the criteria for a given authentication question 112. For example, an authentication question 112 may ask for a selection of items purchased in the past week. The authentication service 110 may identify as a false answer 116 an item purchased by the user outside of the past week. Thus, the false answers 116 presented for a given authentication question 112 vary depending on the user being authenticated.

In an aspect, the authentication service 110 may encode a user interface 109 for rendering by a display element 108 of a user device 102. The user interface 109 may indicate the authentication question 112, and include selectable elements 117 for each valid answer 114 and false answer 116. For example, the selectable elements 117 may include image selections or icons. In an aspect, the authentication service 110 may encode a text string as rendered text in an image. In an aspect, each selectable element 117 is of the same dimension. In such an aspect, the authentication service 110 may generate images for each selectable element 117 with additional bordering or image content to insure a same dimension In an aspect, each selectable element 117 is of a same data size. In such an aspect, the authentication service 110 may generate images for each selectable element 117 with additional bordering, image content, or non-displayed data such as metadata to insure a same file size. In an aspect, each selectable element 117 corresponds to an image including a randomly generated file name. In such aspects, the randomly generated file name, uniform dimension, and uniform size reduce the likelihood of file identification and cache vulnerabilities by malicious users.

A user input to the user device 102 selects one or more of the presented selectable elements 117 in the user interface 109, thereby selecting one or more valid answers 114 and/or one or more false answers 116. Based on the selected valid answers 114 and/or false answers 116, the authentication service 110 determines if the corresponding authentication question 112 has been correctly answered. In an aspect, the authentication service 110 may determine that an authentication question 112 has been correctly answered responsive to a selection of every valid answer 114 presented in the pool of selectable answers. In another aspect, the authentication service 110 may determine that an authentication question 112 has been correctly answered responsive to a selection of a number of valid answers 114 presented in the pool of selectable answers above a threshold. Thus, a user may need not select every valid answer 114 presented.

In an aspect, the authentication service 110 may determine that an authentication question 112 has been incorrectly answered responsive to a selection of any false answer 116 presented in the pool of selectable answers. In such an aspect, even if a user has selected the requisite valid answers 114, an authentication question 112 would be deemed incorrectly answered if one or more false answers 116 are selected. This reduces the vulnerability against brute force or random selection attacks.

In an aspect, if the authentication service 110 determines that an authentication question 112 has been correctly answered, the authentication service 110 determines if a requisite number of authentication questions 112 have been answered. If not, the authentication service 110 may then select another authentication question 112 for presentation to the user device 102. If the requisite number of authentication questions 112 have been answered, the authentication service 110 then establishes an authenticated session with the user device 102.

In an aspect, one or more network devices 116 can be in communication with a network such as network 105. As an example, one or more of the network devices 116 can facilitate the connection of a device, such as user device 102, to the network 105. As a further example, one or more of the network devices 118 can be configured as a wireless access point (WAP). In an aspect, one or more network devices 118 can be configured to allow one or more wireless devices to connect to a wired and/or wireless network using Wi-Fi, Bluetooth or any desired method or standard.

In an aspect, the network devices 118 can be configured as a local area network (LAN). As an example, one or more network devices 118 can comprise a dual band wireless access point As an example, the network devices 118 can be configured with a first service set identifier (SSID) (e.g., associated with a user network or private network) to function as a local network for a particular user or users. As a further example, the network devices 118 can be configured with a second service set identifier (SSID) (e.g., associated with a public/community network or a hidden network) to function as a secondary network or redundant network for connected communication devices.

In an aspect, one or more network devices 118 can comprise an identifier 120. As an example, one or more identifiers can be or relate to an Internet Protocol (IP) Address IPV4/1PV6 or a media access control address (MAC address) or the like. As a further example, one or more identifiers 120 can be a unique identifier for facilitating communications on the physical network segment. In an aspect, each of the network devices 118 can comprise a distinct identifier 120. As an example, the identifiers 120 can be associated with a physical location of the network devices 118.

Figure 2:
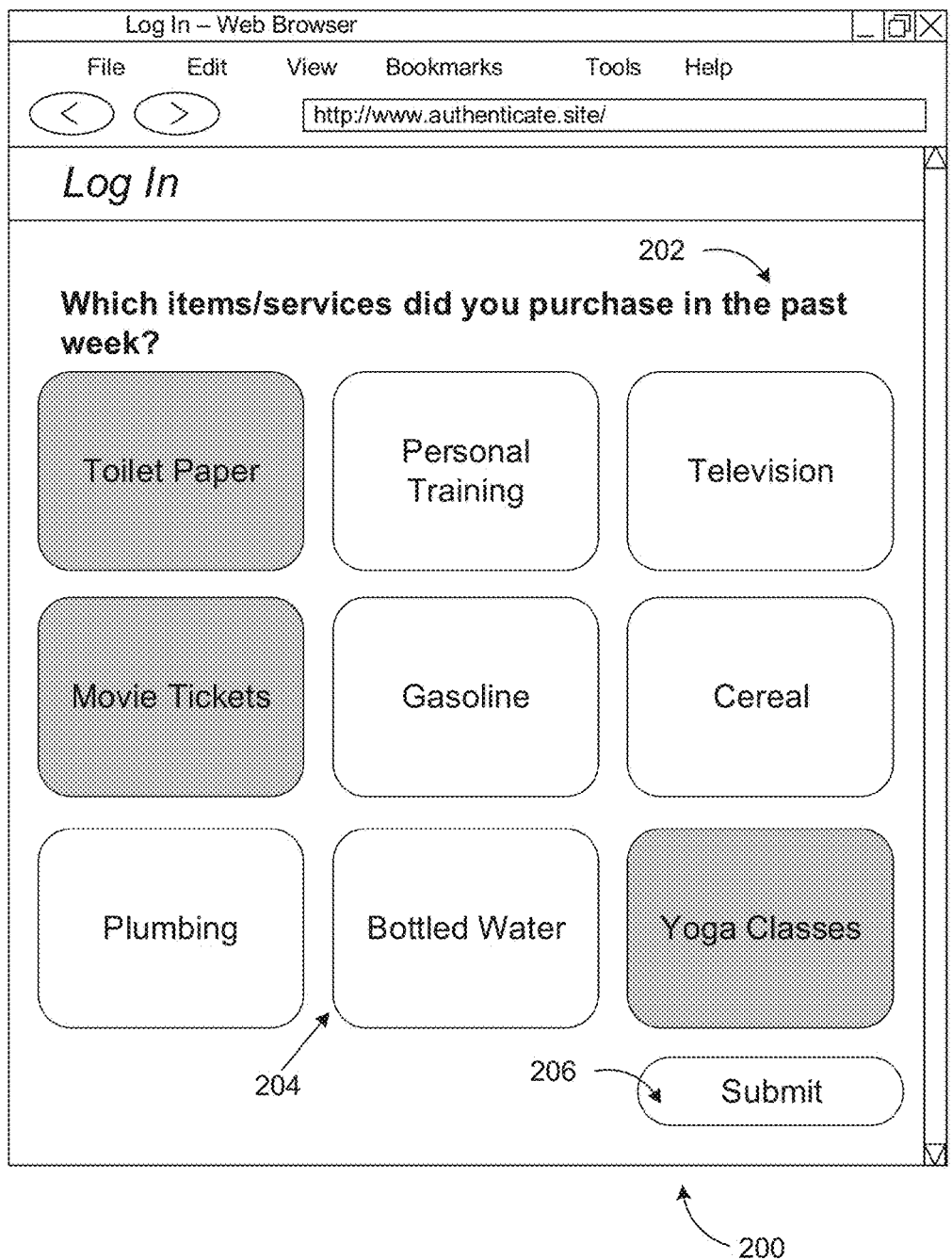
FIG. 2 is an example user interface.

FIG. 2 depicts an example user interface 200. The user interface 200 can be encoded by an authentication service 110 computing device 104 for rendering by a user device 102. Shown in the user interface 200 is an indication 202 of an authentication question 112 and a grid 204 of selectable elements 117. Each of the selectable elements 117 corresponds to a valid answer 114 or a false answer 116 to the given authentication question 112. A selection of the selectable elements 117 are greyed out, indicating their selection according to a user input. Also included in the user interface 200 is a button 206 that submits the selected selectable elements 117 to the authentication service 110.

Figure 3:
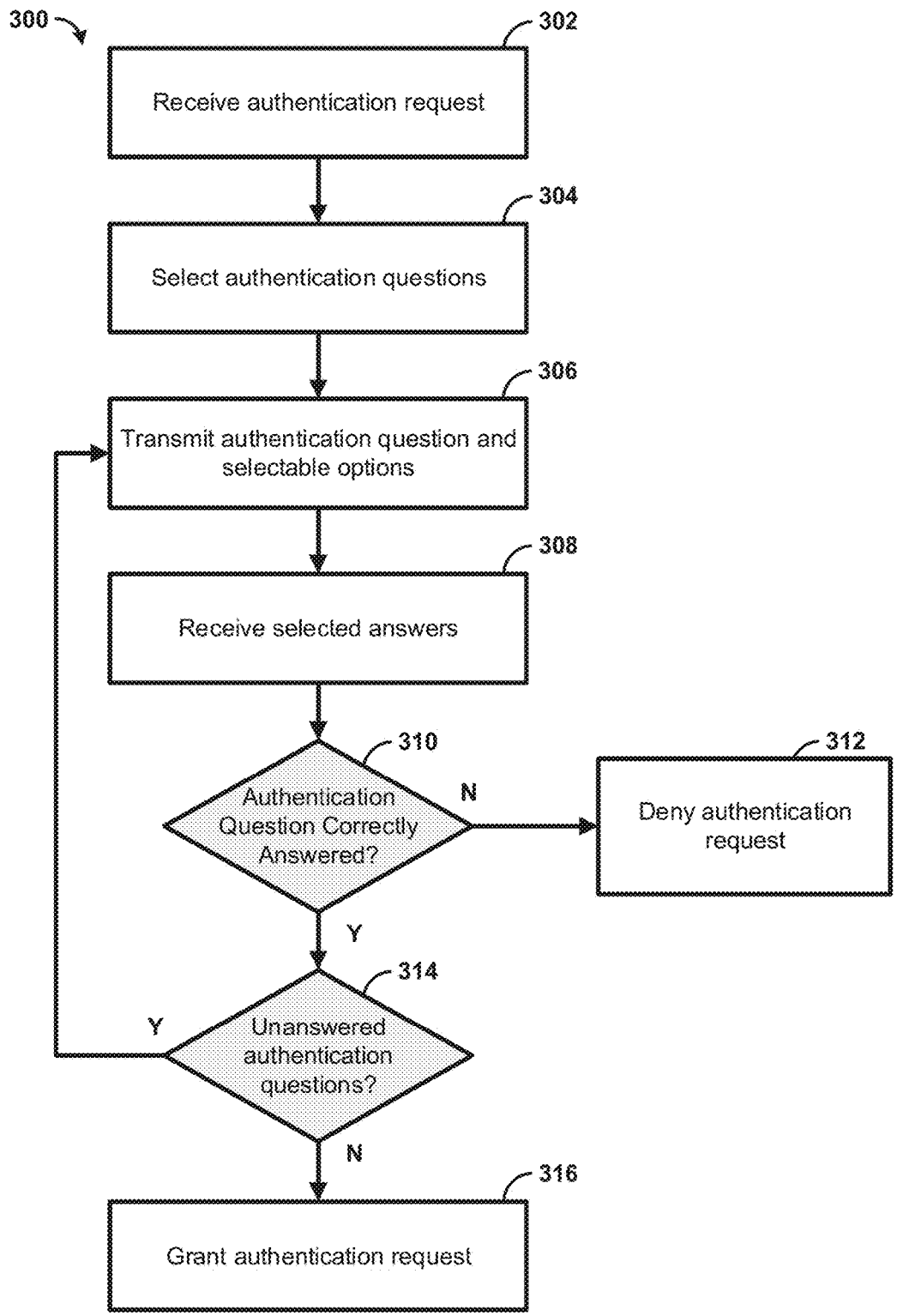
FIG. 3 is a flowchart illustrating an example method.

FIG. 3 is a flowchart 300 depicting an example method. Beginning with step 302, the authentication system 110 receives an authentication request from a user device 102. The authentication request may include a username or other account identifier. The authentication request may also include a device identifying token corresponding to an account to be authenticated.

Next, in step 304, the authentication system 110 selects one or more authentication questions 112 to be transmitted to the user device 102. In an aspect, the authentication system 110 may select a number of authentication questions 112 defined in a user preference. In an aspect, the authentication system 110 may select the authentication questions 112 from a plurality of potential authentication questions 112. In an aspect, the authentication system 110 may select the authentication questions 112 from the potential authentication questions 112 according to a random process. In another aspect, the authentication system 110 may select the authentication questions 112 from the potential authentication questions 112 according to a frequency or recency of use, or other criteria.

After selecting the authentication questions 112, the method advances to step 306 where the authentication system 110 transmits one of the authentication questions 112 to the user device 102. The authentication system 110 also transmits a pool of selectable options for answering the authentication question 112. In an aspect, the pool of selectable options includes at least one valid answer 114 and at least one false answer 116. In an aspect, the at least one valid answer 114 may be derived from aggregated user data including transaction data, purchase or order histories, social networking data, or other data associated with a user and accessible by the authentication system 110. For example, the at least one valid answer 114 may correspond to one or more data points in the aggregated data satisfying criteria of the authentication question 112.

In an aspect, the at least one valid answer 114 transmitted to the user device 102 may correspond to a subset of valid answers 114 for a given authentication question 114. The subset of valid answers 114 may be selected randomly, or according to other criteria. Thus, for a given authentication question 114, the valid answers 114 are dependent on the user account being authenticated, as they are derived from user-specific aggregated data.

In an aspect, the at least one false answer 116 may be derived from the aggregated user data accessible by the authentication system 110. For example, the at least one false answer 116 may correspond to one or more data points in the aggregated data but failing one or more criteria of the authentication question 112. In a further aspect, the at least one false answer 116 may be selected from a pool of potential false answers 116 for a given authentication question 112. In an aspect, transmitting the authentication question 112 and selectable options may be performed by encoding a user interface 109 for rendering by a user device 102. The user interface 109 may include a collection of selectable elements 117 each corresponding to one of the selectable options for the given authentication question 112.

Next, in step 308, the authentication system 112 receives the selected answers for the transmitted authentication question 112 from the user device 102. In an aspect, the selected answers correspond to selected ones of the selectable elements 117 in the user interface 109 transmitted to the user device 102. In step 310 the authentication system 110 determines if the authentication question 112 was correctly answered. In an aspect, the authentication system 110 determines that the authentication question 112 was correctly answered in response to each of the valid answers 114 presented to the user being selected and having none of the false answers 116 being selected. In an aspect, the authentication system 110 determines that the authentication question 112 was correctly answered in response to a number of valid answers 114 above a threshold being selected and having none of the false answers 116 being selected.

If the authentication question 112 was incorrectly answered, the method advances to step 312 where the authentication request is denied. If the authentication question 112 was correctly answered, the method advances to step 314. If there are additional selected authentication questions 112 to be answered, the method returns to box 306 where a next authentication question 112 is transmitted to the user device 102 for answering. Otherwise, if all of the selected authentication questions 112 have been answered, the method advances to step 316, where the authentication system 110 establishes an authenticated session with the user device 102.

Figure 4:
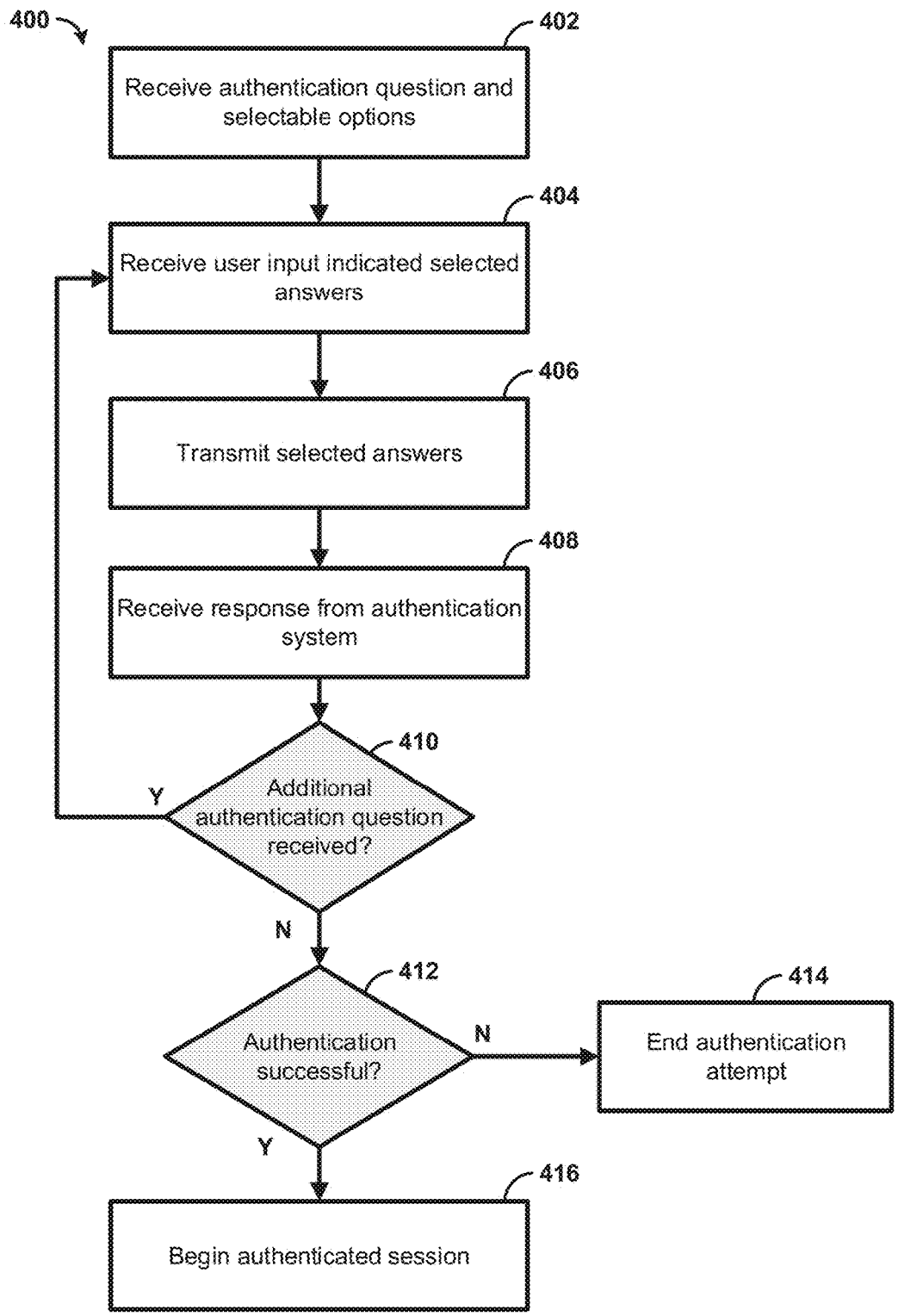
FIG. 4 is a flowchart illustrating an example method.

FIG. 4 is a flowchart 400 depicting an example method. Beginning with step 402, a user device 102 receives an authentication question 112 and selectable options for answering the authentication question 112 from an authentication system 110 in order to establish an authenticated session. In an aspect, this may include receiving data encoding a user interface 109 including the authentication question 112 and multiple selectable elements 117 each corresponding to a selectable option. In an aspect, the selectable elements 117 may correspond to at least one valid answer 114 and at least one false answer 116.

Next, in step 404, the user device 102 receives user input to the selectable elements 117 indicated selected answers to the authentication question 112. In step 406 the selected answers are transmitted to the authentication system 112. A response to the transmitted answers is received from the authentication system 112 in step 408. At step 410, if the response includes a follow-up authentication question 112, the process returns to step 404, where the user device 102 continues to answer authentication questions 112. If, at step 410, a response other than an authentication question 112 is received, the process advances to step 412. If, at step 412, the response indicates a failed authentication, the process advances to step 414, where the authentication system 112 denies authentication and the current authentication attempt ends. Otherwise, the process advances to step 416 where the user device 102 begins an authenticated session, having successfully answered the requisite number of authentication questions 112.

Figure 5:
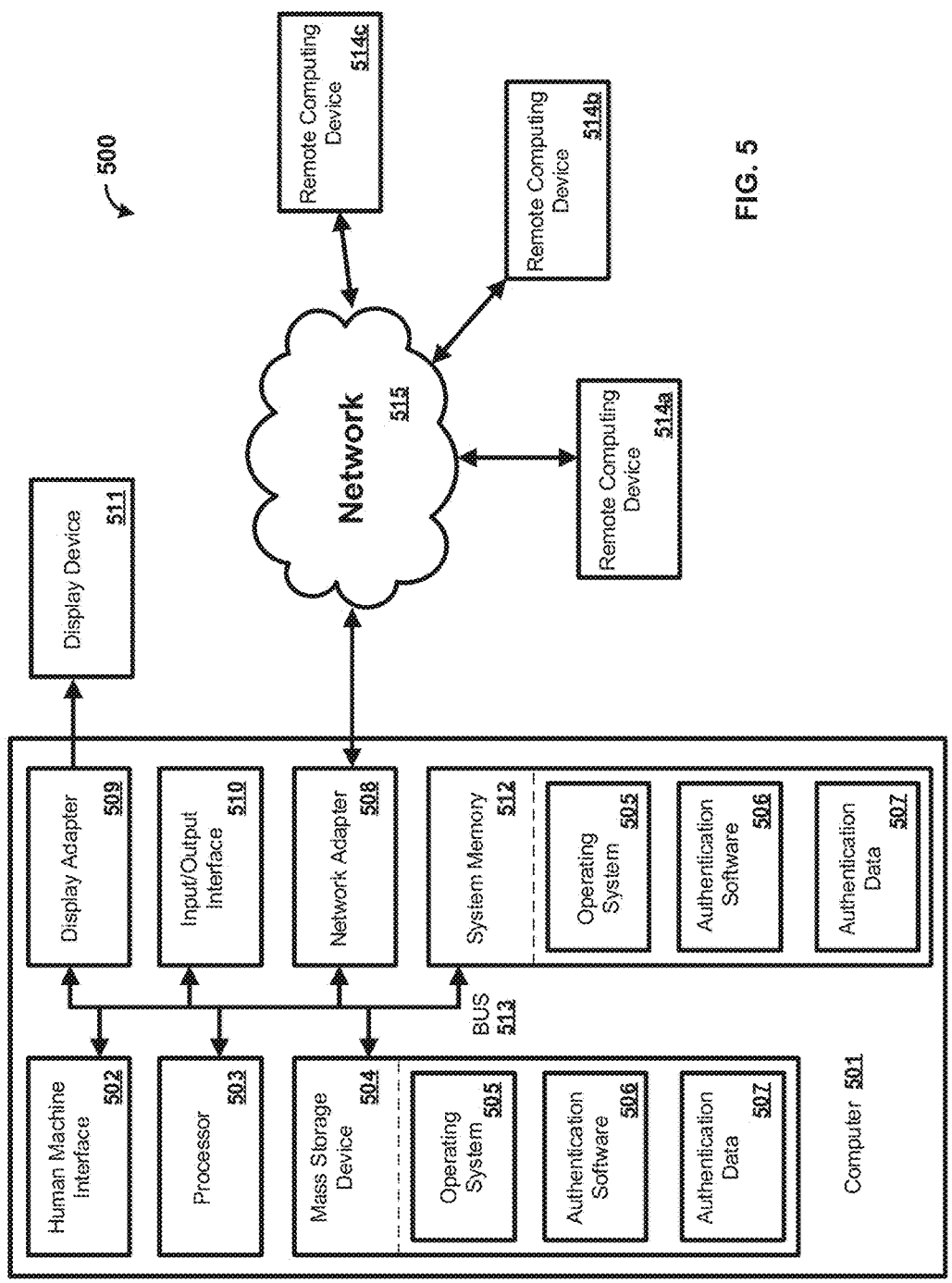
FIG. 5 is a block diagram illustrating an example computing device.

In an exemplary aspect, the methods and systems can be implemented on a computer 501 as illustrated in FIG. 5 and described below. By way of example, computing device 104 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc.

that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 213, and all buses specified in this description can also be implemented over a wired or wireless network connection and each of the subsystems, including the one or more processors 503, a mass storage device 504, an operating system 505, authentication software 506, authentication data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the authentication data 507 and/or program modules such as the operating system 505 and the authentication software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the authentication software 506. Each of the operating system 505 and the authentication software 506 (or some combination thereof) can comprise elements of the programming and the authentication software 506. The authentication data 507 can also be stored on the mass storage device 504. The authentication data 507 can be stored in any of one or more databases known in the art. Examples of such databases comprise, DB2®, Microsoft® Access, Microsoft® SQL Server, Oracle®, mySQL, PostgreSQL, and the like, The databases can be centralized or distributed across multiple systems.

In another aspect, the user can enter commands and information into the computer 501 via an input device (not shown), Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 509 and the computer 501 can have more than one display device 511, For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the authentication software 506 can be stored on or transmitted across sonic form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
dynamically generating, by an authentication system based on transaction data associated with a user of a user device, a plurality of authentication questions;
dynamically generating, based on the plurality of authentication questions, for each of the plurality of authentication questions, one or more valid answers and one or more false answers;
transmitting, to the user device, a first authentication question of the plurality of authentication questions and a plurality of selectable options comprising one or more valid answers and one or more false answers associated with the first authentication question;
receiving, from the user device for the first authentication question, an indication of at least one selected valid answer and at least one unselected false answer from the plurality of selectable options;
transmitting, to the user device, a second authentication question of the plurality of authentication questions and a plurality of selectable options comprising one or more valid answers and one or more false answers associated with the second authentication question;
receiving, from the user device for the second authentication question, an indication of at least one selected valid answer and at least one unselected false answer from the plurality of selectable options;
determining, based on the indication of the at least one unselected false answer for the first authentication question and the indication of the at least one unselected false answer for the second authentication question, that a threshold is satisfied; and
establishing an authenticated session with the user device based on the determination that the threshold is satisfied.

2. The method of claim 1, further comprising aggregating at least a portion of the transaction data from a third party service.

3. The method of claim 1, wherein the one or more valid answers and the one or more false answers for each authentication question are dynamically generated based on a social network profile associated with the user.

4. The method of claim 2, wherein aggregating the at least a portion of the transaction data is facilitated by at least one of authentication credentials or permissions obtained from the user.

5. The method of claim 1, wherein the threshold is satisfied based on a determination that a threshold number of the one or more valid answers associated with the first authentication question are selected by the user.

6. The method of claim 1, wherein the one or more valid answers and the one or more false answers associated with the first authentication question comprise at least four answers.

7. The method of claim 1, wherein the one or more valid answers and the one or more false answers associated with the second authentication question comprise at least four answers.

8. The method of claim 1, wherein the threshold is satisfied based on a determination that a threshold number of the one or more false answers associated with the first authentication question are not selected by the user.

9. The method of claim 1, further comprising selecting the plurality of selectable options as a number of selectable options defined by a user preference.

10. The method of claim 1, wherein transmitting the first authentication question and the plurality of selectable options comprises transmitting a user interface to the user device, the user interface comprising a plurality of selectable elements corresponding to the plurality of selectable options.

11. A method comprising: selecting, by an authentication system, at least one authentication question;
determining, based on transaction data associated with a user of a user device, at least one valid answer for each of the at least one authentication question, wherein the transaction data comprises one or more transactions associated with one or more purchases using a payment method associated with the user;

transmitting, to the user device, the at least one authentication question and a plurality of selectable options comprising the at least one valid answer and at least one false answer;

receiving, from the user device for each of the at least one authentication question, an indication of at least one selected answer and at least one non-selected answer from the plurality of selectable options;

transmitting, to the user device, at least one further authentication question and a further plurality of selectable options comprising at least one valid answer and at least one false answer;

receiving, from the user device for each of the at least one further authentication question, an indication of at least one selected answer and at least one non-selected answer from the further plurality of selectable options;

determining, based on the indication of the at least one selected answer and the at least one non-selected answer for the at least one authentication question and the at least one selected answer and the at least one non-selected answer for the at least one further authentication question, that a first threshold and a second threshold are satisfied; and establishing an authenticated session with the user device based on the determination that the first threshold and the second threshold are satisfied.

12. A system, comprising:

at least one computing device, configured to:

dynamically generate, based on transaction data associated with a user of a user device, a plurality of authentication questions;

dynamically generate, based on the plurality of authentication questions, for each of the plurality of authentication questions, one or more valid answers and one or more false answers;

transmit, to the user device, a first authentication question of the plurality of authentication questions and a plurality of selectable options comprising one or more valid answers and one or more false answers associated with the first authentication question;

receive, from the user device for the first authentication question, an indication of at least one selected valid answer and at least one unselected false answer from the plurality of selectable options;

transmit, to the user device, a second authentication question of the plurality of authentication questions and a plurality of selectable options comprising one or more valid answers and one or more false answers associated with the second authentication question;

receive, from the user device for the second authentication question, an indication of at least one selected valid answer and at least one unselected false answer from the plurality of selectable options;

determine, based on the indication of the at least one unselected false answer for the first authentication question and the indication of the at least one unselected false answer for the second authentication question, that a threshold is satisfied; and establish an authenticated session with the user device based on the determination that the threshold is satisfied.

13. The system of claim 12, wherein the at least one computing device is further configured to aggregate at least a portion of the transaction data from a third party service.

14. The system of claim 12, wherein the one or more valid answers and the one or more false answers for each authentication question are dynamically generated based on a social network profile associated with the user.

15. The system of claim 13, wherein aggregating the at least a portion of the transaction data is facilitated by at least one of authentication credentials or permissions obtained from the user.

16. The system of claim 12, wherein the threshold is satisfied based on a determination that a threshold number of the one or more valid answers associated with the first authentication question are selected by the user.

17. The system of claim 12, wherein the one or more valid answers and the one or more false answers associated with the first authentication question comprise at least four answers.

18. The system of claim 12, wherein the one or more valid answers and the one or more false answers associated with the second authentication question comprise at least four answers.

19. The system of claim 12, wherein the threshold is satisfied based on a determination that a threshold number of the one or more false answers associated with the first authentication question are not selected by the user.

20. The system of claim 12, wherein the threshold is satisfied based on a determination that a threshold number of the one or more false answers associated with the second authentication question are not selected by the user.

* * * * *